United States Patent
Pilote et al.

(10) Patent No.: US 9,309,579 B2
(45) Date of Patent: Apr. 12, 2016

(54) STARTING A SMELTING PROCESS

(71) Applicant: TECHNOLOGICAL RESOURCES PTY, LIMITED, Brisbane (AU)

(72) Inventors: Jacques Pilote, Doubleview (AU); Rodney James Dry, City Beach (AU); Hendrikus Koenraad Albertus Meijer, Uitgeest (NL)

(73) Assignee: Technological Resources Pty, Limited, Brisbane, Queensland (AU)

( * ) Notice: Subject to any disclaimer, the term of this patent is extended or adjusted under 35 U.S.C. 154(b) by 160 days.

(21) Appl. No.: 14/363,217

(22) PCT Filed: Dec. 6, 2012

(86) PCT No.: PCT/AU2012/001487
§ 371 (c)(1),
(2) Date: Jun. 5, 2014

(87) PCT Pub. No.: WO2013/082659
PCT Pub. Date: Jun. 13, 2013

(65) Prior Publication Data
US 2014/0345425 A1 Nov. 27, 2014

(30) Foreign Application Priority Data

Dec. 6, 2011 (AU) ................................ 2011905076

(51) Int. Cl.
| | |
|---|---|
| *C21C 7/00* | (2006.01) |
| *C21B 11/08* | (2006.01) |
| *C21C 5/50* | (2006.01) |
| *F27D 3/15* | (2006.01) |
| *C22B 5/10* | (2006.01) |
| *C22B 5/12* | (2006.01) |
| *C21B 13/00* | (2006.01) |
| *C21C 5/56* | (2006.01) |
| *F27D 3/16* | (2006.01) |

(Continued)

(52) U.S. Cl.
CPC ............. *C21B 11/08* (2013.01); *C21B 13/0013* (2013.01); *C21C 5/567* (2013.01); *C22B 5/10* (2013.01); *C22B 5/12* (2013.01); *F27B 3/105* (2013.01); *F27B 3/225* (2013.01); *F27D 3/1536* (2013.01); *F27D 3/16* (2013.01); *F27D 3/18* (2013.01); *C21C 7/0087* (2013.01); *F27M 2003/13* (2013.01); *Y02P 10/122* (2015.11); *Y02P 10/136* (2015.11); *Y02P 10/265* (2015.11); *Y02P 10/283* (2015.11)

(58) Field of Classification Search
CPC ...... C21C 7/0087; C21C 5/567; C21B 11/08; F27D 3/1536
See application file for complete search history.

(56) References Cited

U.S. PATENT DOCUMENTS 4,047,942 A * 9/1977 Clark .................... C22C 35/005
420/429
6,387,153 B1 5/2002 Burke
(Continued)

OTHER PUBLICATIONS

International Search Report and Written Opinion for PCT/AU2012/001487, mailed Feb. 20, 2013.
(Continued)

*Primary Examiner* — George Wyszomierski
*Assistant Examiner* — Tima M McGuthry Banks
(74) *Attorney, Agent, or Firm* — Banner & Witcoff, Ltd.

(57) ABSTRACT

A method of starting a smelting process in a smelting vessel includes heating frozen slag and forming molten slag and draining molten slag from a forehearth connection via a forehearth and establishing a clear flow path through the forehearth connection and thereafter hot starting the smelting process.

9 Claims, 3 Drawing Sheets

(51) Int. Cl.
*F27D 3/18* (2006.01)
*F27B 3/10* (2006.01)
*F27B 3/22* (2006.01)

(56) References Cited

U.S. PATENT DOCUMENTS

| | | | |
|---|---|---|---|
| 6,440,195 B1 * | 8/2002 | Dry | C21B 13/0013 75/453 |
| 6,517,605 B1 | 2/2003 | Bates et al. | |
| 2010/0261599 A1 * | 10/2010 | Dunn | C04B 35/1015 501/100 |
| 2010/0287992 A1 * | 11/2010 | Hayton | C21B 11/08 65/324 |

OTHER PUBLICATIONS

Australian Patent Office, International Type Search Report, dated Apr. 2, 2012.

* cited by examiner

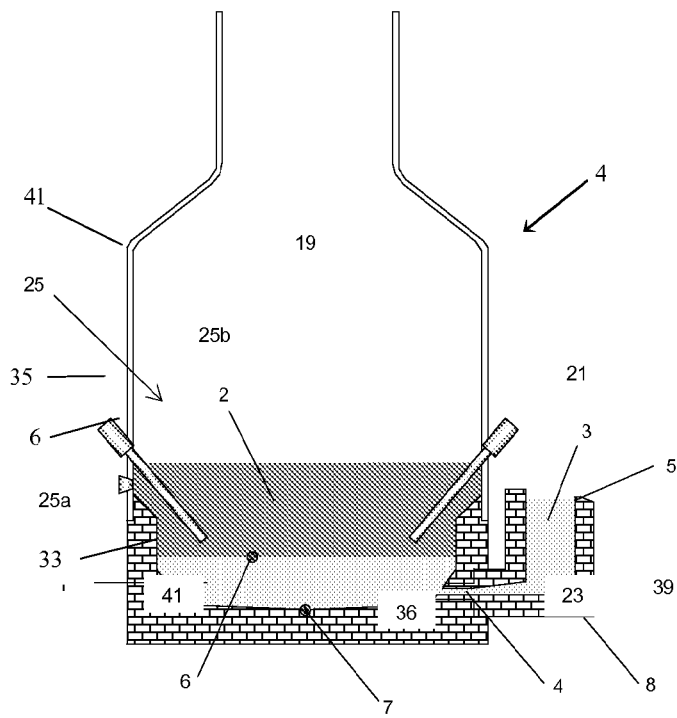
Figure 2  Normal Smelting Vessel End-Tapping
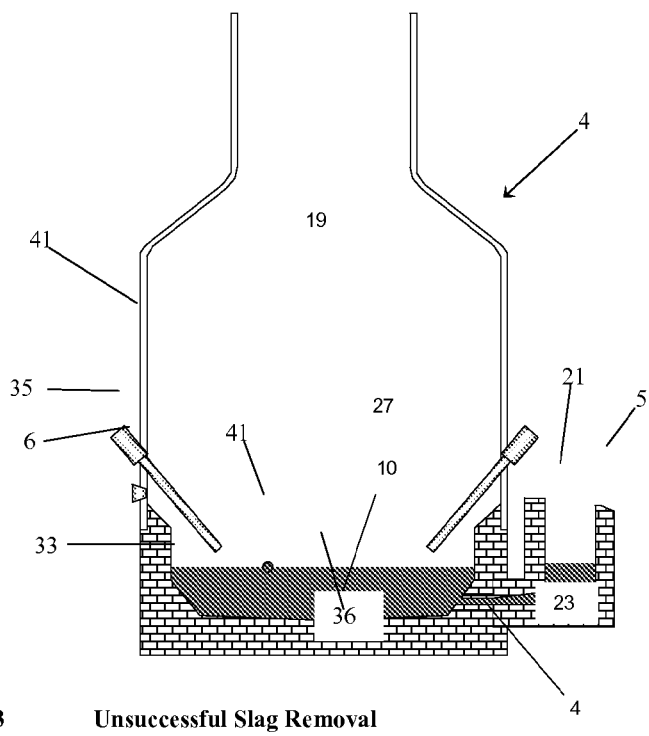
Figure 3  Unsuccessful Slag Removal

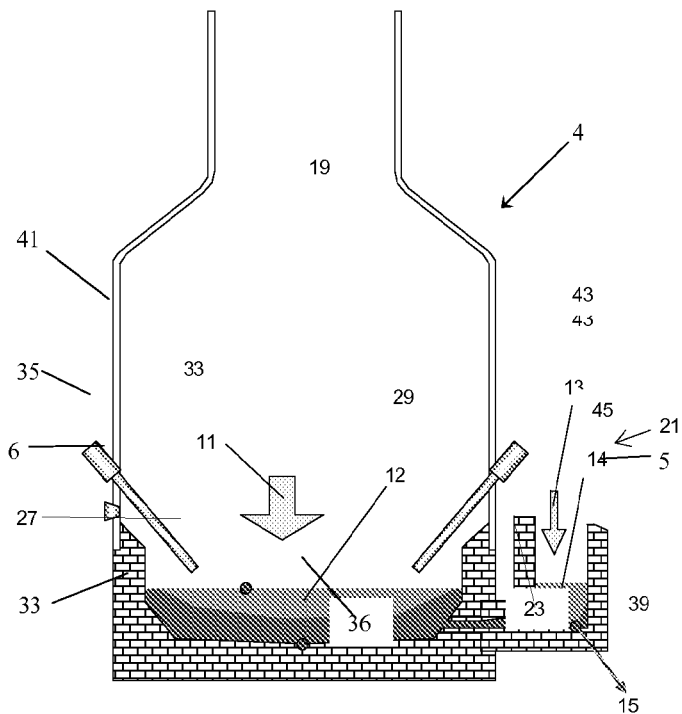
Figure 4    Initial Heating Steps in Re-start Method
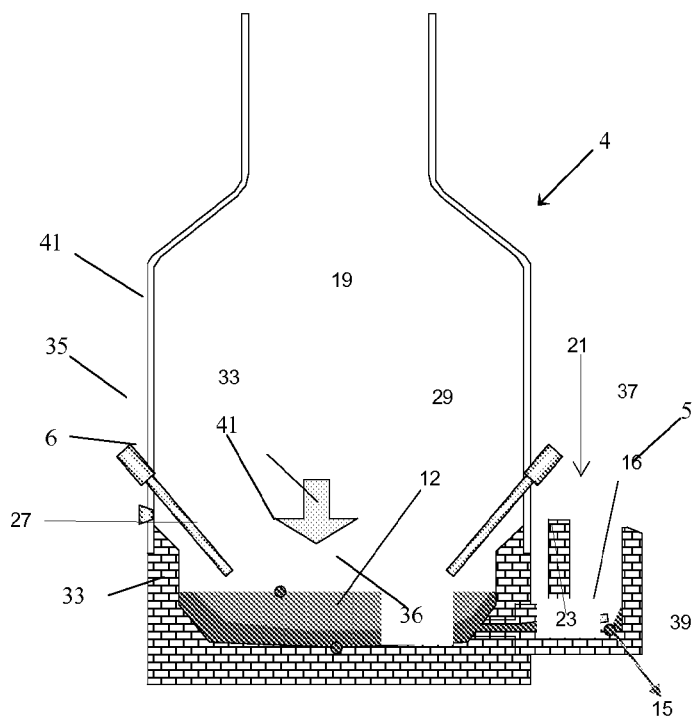
Figure 5    Connection Melting in Re-Start Method

STARTING A SMELTING PROCESS

CROSS-REFERENCE TO RELATED APPLICATIONS

The present application is a U.S. National Phase filing of International Application No. PCT/AU2012/001487, filed Dec. 6. 2012, designating the Untied Sates of America and claiming priority to Australian Patent Application No. 2011905076, filed Dec. 6, 2011, and this application claims priority to and the benefit of the above-identified applications, which are both incorporated by reference herein in their entireties.

TECHNICAL FIELD

The present invention relates to a method of starting a process for smelting a metalliferous material.

The term "metalliferous material" is understood herein to include solid feed material and molten feed material. The term also includes within its scope partially reduced metalliferous material.

BACKGROUND ART

The present invention relates more particularly, although by no means exclusively, to a method of starting a molten bath-based smelting process for producing molten metal from a metalliferous feed material in a smelting vessel that has a strong bath/slag fountain generated by gas evolution in the molten bath, with the gas evolution being at least partly the result of devolatilisation of carbonaceous material into the molten bath.

In particular, although by no means exclusively, the present invention relates to a method of starting a process for smelting an iron-containing material, such as an iron ore, and producing molten iron.

The present invention relates particularly, although by no means exclusively, to a method of starting a smelting process in a smelting vessel that includes a main chamber for smelting metalliferous material.

A known molten bath-based smelting process is generally referred to as the HIsmelt process, is described in a considerable number of patents and patent applications in the name of the applicant.

Another molten bath-based smelting process is referred to hereinafter as the "HIsarna" process. The HIsarna process and apparatus are described in International application PCT/AU99/00884 (WO 00/022176) in the name of the applicant.

The HIsmelt process and the HIsarna processes are associated particularly with producing molten iron from iron ore or another iron-containing material.

In the context of producing molten iron, the HIsmelt process includes the steps of:

(a) forming a bath of molten iron and slag in a main chamber of a smelting vessel;
(b) injecting into the bath: (i) iron ore, typically in the form of fines; and (ii) a solid carbonaceous material, typically coal, which acts as a reductant of the iron ore feed material and a source of energy; and
(c) smelting iron ore to iron in the bath.

The term "smelting" is herein understood to mean thermal processing wherein chemical reactions that reduce metal oxides take place to produce molten metal.

In the HIsmelt process solid feed materials in the form of metalliferous material and solid carbonaceous material are injected with a carrier gas into the molten bath through a number of lances which are inclined to the vertical so as to extend downwardly and inwardly through the side wall of the main chamber of the smelting vessel and into a lower region of the vessel so as to deliver at least part of the solid feed materials into the metal layer in the bottom of the main chamber. The solid feed materials and the carrier gas penetrate the molten bath and cause molten metal and/or slag to be projected into a space above the surface of the bath and form a transition zone. A blast of oxygen-containing gas, typically oxygen-enriched air or pure oxygen, is injected into an upper region of the main chamber of the vessel through a downwardly extending lance to cause post-combustion of reaction gases released from the molten bath in the upper region of the vessel. In the transition zone there is a favourable mass of ascending and thereafter descending droplets or splashes or streams of molten metal and/or slag which provide an effective medium to transfer to the bath the thermal energy generated by post-combusting reaction gases above the bath.

Typically, in the case of producing molten iron, when oxygen-enriched air is used, it is fed at a temperature of the order of 1200° C. and is generated in hot blast stoves. If technically pure cold oxygen is used, it is typically fed at or close to ambient temperature.

Off-gases resulting from the post-combustion of reaction gases in the smelting vessel are taken away from the upper region of the smelting vessel through an off-gas duct.

The smelting vessel includes refractory-lined sections in the lower hearth and water cooled panels in the side walls and the roof of the main chamber of the vessel, and water is circulated continuously through the panels in a continuous circuit.

The HIsmelt process enables large quantities of molten iron, typically at least 0.5 Mt/a, to be produced by smelting in a single compact vessel.

The HIsarna process is carried out in a smelting apparatus that includes (a) a smelting vessel that includes a main smelting chamber and lances for injecting solid feed materials and oxygen-containing gas into the main chamber and is adapted to contain a bath of molten metal and slag and (b) a smelt cyclone for pre-treating a metalliferous feed material that is positioned above and communicates directly with the smelting vessel.

The term "smelt cyclone" is understood herein to mean a vessel that typically defines a vertical cylindrical chamber and is constructed so that feed materials supplied to the chamber move in a path around a vertical central axis of the chamber and can withstand high operating temperatures sufficient to at least partially melt metalliferous feed materials.

In one form of the HIsarna process, carbonaceous feed material (typically coal) and optionally flux (typically calcined limestone) are injected into a molten bath in the main chamber of the smelting vessel. The carbonaceous material is provided as a source of a reductant and a source of energy. Metalliferous feed material, such as iron ore, optionally blended with flux, is injected into and heated and partially melted and partially reduced in the smelt cyclone. This molten, partly reduced metalliferous material flows downwardly from the smelt cyclone into the molten bath in the smelting vessel and is smelted to molten metal in the bath. Hot reaction gases (typically $CO$, $CO_2$, $H_2$, and $H_2O$) produced in the molten bath is partially combusted by oxygen-containing gas (typically technical-grade oxygen) in an upper part of the main chamber. Heat generated by the post-combustion is transferred to molten droplets in the upper section that fall back into the molten bath to maintain the temperature of the bath. The hot, partially-combusted reaction gases flow upwardly from the main chamber and enter the bottom of the smelt cyclone. Oxygen-containing gas (typically technical-grade oxygen) is injected into the smelt cyclone via tuyeres that are arranged in such a way as to generate a cyclonic swirl pattern in a horizontal plane, i.e. about a vertical central axis of the chamber of the smelt cyclone. This injection of oxygen-containing gas leads to further combustion of smelting vessel gases, resulting in very hot (cyclonic) flames. Finely divided incoming metalliferous feed material is injected pneumatically into these flames via tuyeres in the smelt cyclone, resulting in rapid heating and partial melting accompanied by partial reduction (roughly 10-20% reduction). The reduction is due to both thermal decomposition of hematite and the reducing action of $CO/H_2$ in the reaction gases from the main chamber. The hot, partially melted metalliferous feed material is thrown outwards onto the walls of the smelt cyclone by cyclonic swirl action and, as described above, flows downwardly into the smelting vessel below for smelting in the main chamber of that vessel.

The net effect of the above-described form of the HIsarna process is a two-step countercurrent process. Metalliferous feed material is heated and partially reduced by outgoing reaction gases form the smelting vessel (with oxygen-containing gas addition) and flows downwardly into the smelting vessel and is smelted to molten iron in the smelting vessel. In a general sense, this countercurrent arrangement increases productivity and energy efficiency.

The HIsmelt and the HIsarna processes include solids injection into molten baths in smelting vessels via water-cooled solids injection lances.

In addition, a key feature of both processes is that the processes operate in smelting vessels that include a main chamber for smelting metalliferous material and a forehearth connected to the main chamber via a forehearth connection that allows continuous metal product outflow from the vessels. A forehearth operates as a molten metal-filled siphon seal, naturally "spilling" excess molten metal from the smelting vessel as it is produced. This allows the molten metal level in the main chamber of the smelting vessel to be known and controlled to within a small tolerance—this is essential for plant safety. Molten metal level must (at all times) be kept at a safe distance below water-cooled elements such as solids injection lances extending into the main chamber, otherwise steam explosions become possible. It is for this reason that the forehearth is considered an inherent part of a smelting vessel for the HIsmelt and the HIsarna processes.

The term "forehearth" is understood herein to mean a chamber of a smelting vessel that is open to the atmosphere and is connected to a main smelting chamber of the smelting vessel via a passageway (referred to herein as a "forehearth connection") and, under standard operating conditions, contains molten metal in the chamber, with the forehearth connection being completely filled with molten metal.

The above description is not to be taken as an admission of the common general knowledge in Australia or elsewhere.

During the course of pilot plant trials of the HIsarna process it became necessary for the applicant to make an unscheduled end-tap of the smelting vessel used in the trials. Molten metal was removed successfully from the main chamber of the smelting vessel in the end-tap, but substantially all of the molten slag remained behind and solidified in the smelting vessel. This resulted in the main chamber, the forehearth connection and the forehearth of the smelting vessel being filled with cold (frozen) slag to a level above the level of the forehearth connection between the forehearth and the main chamber of the smelting vessel.

Standard process start-up for the HIsmelt process and the proposed process start-up for the HIsarna process involve establishing a molten metal bath in the smelting vessel by pouring a charge of fresh molten metal into the vessel via the forehearth and the forehearth connection. Before the pilot plant could be started again, it was therefore necessary to re-establish a clear connection between the forehearth and the smelting vessel. A standard option of allowing the entire system to cool down and then mechanically digging out frozen slag was considered by the applicant to be too time-consuming and therefore not a preferred option.

SUMMARY OF THE DISCLOSURE

The present invention is based on a realisation that it is possible, in a shorter time than that associated with the cooling/mechanical slag removal option described above, to recover from such a frozen slag/blocked forehearth connection situation by using heat sources to melt slag and drain it out of the system via the forehearth and establish a clear flow path through the forehearth to make it possible to supply a charge of molten metal to the main chamber via the forehearth to re-start the process.

The present invention provides a method of starting (which term includes "re-starting") a smelting process in a smelting vessel that includes a main chamber for smelting a metalliferous material and producing molten metal and a forehearth connected to the main smelting chamber via a forehearth connection, and which smelting vessel contains frozen slag that blocks at least the forehearth connection, the method of starting the process including heating frozen slag and forming molten slag and draining molten slag from the forehearth connection via the forehearth and establishing a clear flow path through the forehearth connection and thereafter hot starting the smelting process by a series of steps including supplying a charge of molten metal into the main chamber via the forehearth connection and supplying feed materials to the process and smelting the metalliferous material and producing molten metal.

The method may include removing molten slag via a forehearth end-drain taphole in a lowest region of the forehearth.

The method may include pressurising the main chamber to facilitate draining molten slag from the forehearth connection.

The method may include heating and melting frozen slag in the forehearth connection via oxygen-enriched gas burners and/or oxygen lances.

In a situation in which there is frozen slag in the main chamber, as well as frozen slag in the forehearth connection, the method may include heating and melting frozen slag in the main chamber and the forehearth connection.

The method may include heating and melting frozen slag in the main chamber via heat from a burner system for the main chamber. The burner system may be a fuel gas burner system using either air or and oxygen-air mixture. The burner system may be a system used to pre-heat the main chamber during a standard process start-up.

In a situation in which there is frozen slag in the forehearth, as well as frozen slag in the forehearth connection, the method may include heating and melting frozen slag in the forehearth and the forehearth connection. The method may include using gas burners and/or oxygen lances to melt frozen slag in the forehearth.

In a situation in which there is frozen slag in the main chamber, the forehearth connection, and the forehearth, the method may include heating and melting frozen slag in the main chamber, the forehearth and the forehearth connection.

The sequence of the heating steps may be selected as required depending on factors such as the amount of frozen slag in the main chamber and the size of the main chamber. For example, it may be preferable form a timing perspective to start heating and melting frozen slag in the main chamber before starting heating frozen slag in the forehearth. This may not always be the case.

For example, a situation in which there is frozen slag in the main chamber, the forehearth connection, and the forehearth, the method may include the steps of:

(a) heating and melting frozen slag in the main chamber;
(b) heating and melting frozen slag in the forehearth;
(c) draining molten slag from the forehearth,
(d) heating and melting frozen slag in the forehearth connection;
(e) draining molten slag from the forehearth connection and the main chamber via the forehearth and establishing a clear flow path through the forehearth connection; and
(f) hot starting the smelting process by a series of steps including supplying a charge of molten material into the main chamber via the forehearth connection and supplying feed materials to the process and smelting the metalliferous material and producing molten metal.

More particularly, the method may include the following steps.

(i) Heating the main chamber (typically by the same means used to preheat it prior to initially charging hot metal) and melting frozen slag in the main chamber. This will usually involve a fuel gas burner system using either air or and oxygen-air mixture in the main chamber. The purpose of this heating step, under current conditions, is to create molten slag in the main chamber for later discharge via the forehearth. Since melting slag is relatively slow, this step is typically initiated first and executed in parallel with steps (ii) to (iv) below of heating and melting frozen slag in the forehearth and the forehearth connection. However, this may not always be the case, and there may be situations in which it is preferable to clear frozen slag from the forehearth and the forehearth connection before melting frozen slag in the main chamber.

(ii) Heating a top (i.e. open) part of the forehearth using gas burners and/or oxygen lances. The purpose of this step is to generate molten slag in the main part of the forehearth.

(iii) Draining molten slag from the forehearth end-drain taphole (i.e. a taphole at the lowest point in the forehearth cavity), thereby creating a substantially empty forehearth which allows direct access to the blocked forehearth connection between the forehearth and the main chamber.

(iv) Applying heat to the blocked forehearth connection using oxygen-enriched gas burners and/or oxygen lances positioned to generate heat from the forehearth side of the forehearth connection, with the aim of melting and removing slag (via the forehearth end-drain taphole) from the forehearth connection area. This results in establishment of a path for molten slag in the main chamber to be drained.

(v) Draining molten slag generated in step (i) from the main chamber via the forehearth end-drain taphole in sufficient quantity to re-establish a clear flow path through the forehearth connection and within the main chamber and the forehearth for charging fresh hot metal into the smelting vessel via the forehearth and the forehearth connection. This step may include pressurising the main chamber to facilitate draining molten slag from the forehearth connection.

(vi) Starting the process by charging fresh hot metal into the main chamber via the forehearth and the forehearth connection and subsequent steps to re-start smelting in the main chamber.

The method may include adding lime or other materials to the main chamber and/or the forehearth to control the liquidus temperature of molten slag formed in the main chamber and/or the forehearth.

The steps to start the process in a situation in which the process is the HIsarna process may include:

(a) preheating at least the main chamber of the smelting vessel,
(b) adding a charge of a molten metal to the main chamber,
(c) commencing supplying an oxygen-containing gas to the main chamber,
(d) commencing supplying a carbonaceous material to the main chamber,
(e) monitoring for ignition of the carbonaceous material, and
(f) after establishing that ignition has occurred, commencing supplying a metalliferous feed material and an oxygen-containing gas into a smelt cyclone and generating a circulating flow of material in the cyclone and combusting a combustible gas flowing upwardly into the cyclone from the main chamber and partially reducing and melting the metalliferous feed material in the cyclone, whereby the partially reduced molten metalliferous feed material flows downwardly from the cyclone into the molten bath of metal and slag in the vessel and is smelted to molten metal in the bath.

After establishing that ignition has occurred, the steps to start the HIsarna process may include commencing supplying slag or a slag forming material to the main chamber to form a slag on the molten metal

BRIEF DESCRIPTION OF THE DRAWINGS

An embodiment of the method of starting a smelting process in a smelting vessel that contains molten slag at least in a forehearth connection of the vessel in accordance with the present invention is described with reference to the accompanying drawings, of which:

FIG. 2 is a cross-sectional view of the smelting vessel shown in FIG. 1 which illustrates molten metal and molten slag levels in the vessel when the HIsarna process is operating normally and producing molten metal;

FIG. 3 is a cross-sectional view of the smelting vessel shown in FIG. 1 which illustrates schematically the condition of the smelting vessel when an end-tap of the smelting vessel has not been successful with respect to slag removal and the vessel contains frozen slag;

FIG. 4 is a cross-sectional view of the smelting vessel shown in FIG. 1 which illustrates schematically the condition of the vessel during a step of reheating the main chamber of the vessel via a heat source in the main chamber to melt frozen slag in accordance with one embodiment of a method of re-starting the HIsarna process in accordance with the present invention; and FIG. 5 is a cross-sectional view of the smelting vessel shown in FIG. 1 which illustrates schematically the condition of the vessel during a later step of the method of re-starting the HIsarna process in accordance with one embodiment of the present invention.

DESCRIPTION OF EMBODIMENT(S)

Figure 1:
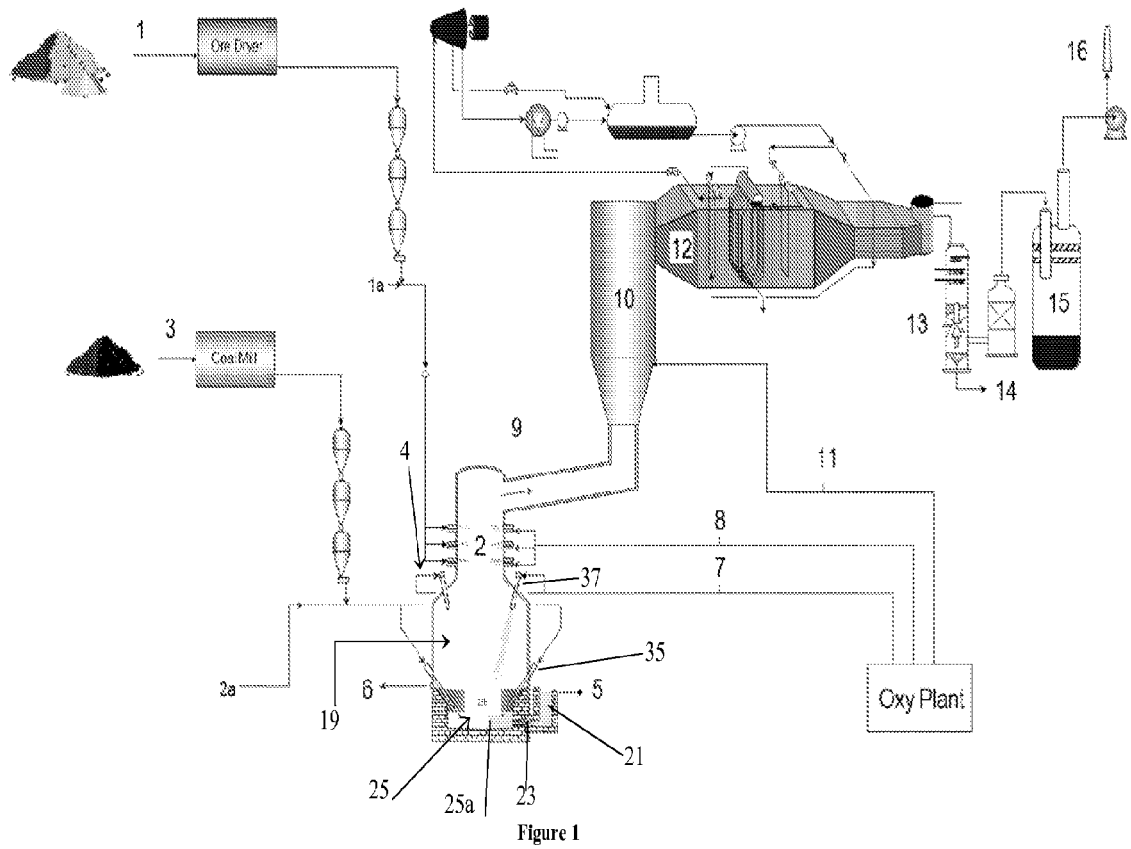
FIG. 1 is a diagrammatic view of a HIsarna apparatus for smelting a metalliferous material and producing molten metal in accordance with one embodiment of the HIsarna process.

The HIsarna process smelts metalliferous feed material and produces process outputs of molten metal, molten slag, and an off-gas. The following description of the HIsarna process is in the context of smelting metalliferous material in the form of iron ore. The present invention is not limited to this type of metalliferous material.

The HIsarna apparatus shown in FIG. 1 includes a smelt cyclone 2 and a molten bath-based smelting vessel 4 having a main chamber 19 located directly beneath the smelt cyclone 2, with direct communication between the chambers of the smelt cyclone 2 and the smelting vessel 4.

With reference to FIG. 1, during steady-state operation of a smelting campaign, a blend of magnetite-based ore (or other iron ore) with a top size of 6 mm and flux such as limestone 1 is fed, via an ore dryer, and with a pneumatic conveying gas 1a, into the smelt cyclone 2. Limestone represents roughly 8-10 wt % of the combined stream of ore and limestone. Oxygen 8 is injected into the smelt cyclone 2 via tuyeres to preheat and partly melt and partly reduce the ore. The oxygen 8 also combusts combustible gas flowing upwardly into the smelt cyclone 2 from the smelting vessel 4. The partly melted and partly reduced ore flows downwardly from the smelt cyclone 2 into a molten bath 25 of metal and slag in the main chamber 19 in the smelting vessel 4. The partly melted and partly reduced ore is smelted to form molten iron in the molten bath 25. Coal 3 is fed, via a separate dryer, to the main chamber 19 of the smelting vessel 4. The coal 3 and a conveying gas 2a are injected via lances 35 into the molten bath 25 of metal and slag in the main chamber 19. The coal provides a source of a reductant and a source of energy. FIGS. 1-5 show the molten bath 25 as comprising two layers, of which layer 25a is a molten metal layer and layer 25b is a molten slag layer. The Figures illustrate the layers as being of uniform depth. This is for illustration purposes only and is not an accurate representation of what would be a highly agitated and well-mixed bath in operation of the HIsarna process. The mixing of the molten bath 25 is due to devolatilisation of coal in the bath, which generates gas, such as CO and $H_2$, and results in upward movement of gas and entrained material from the molten bath into a top space of the main chamber 19 that is above the molten bath 25. Oxygen 7 is injected into the main chamber 19 via lances 37 to post-combust some of these gases, typically CO and $H_2$, generated in and released from the molten bath 25 in the top space of the main chamber 19 and provide the necessary heat for the smelting process in the bath.

Normal operation of the HIsarna process during a smelting campaign involves (a) coal injection via lances 35 and cold oxygen injection via lances 37 into the main chamber 19 of the smelting vessel 4 and (b) ore injection 7 and additional oxygen injection 8 into the smelt cyclone 2.

The operating conditions, including but not limited to, coal and oxygen feed rates into the main chamber 19 of the smelting vessel 4 and ore and oxygen feed rates into the smelt cyclone 2 and heat losses from the main chamber 19, are selected so that offgas leaving the smelt cyclone 2 via an offgas outlet duct 9 has a post-combustion degree of at least 90%.

Offgas from the smelt cyclone 2 passes via an offgas duct 9 to an offgas incinerator 10, where additional oxygen 11 is injected to burn residual CO/$H_2$ and provide a degree of free oxygen (typically 1-2%) in the fully combusted flue gas.

Fully combusted offgas then passes through a waste heat recovery section 12 where the gas is cooled and steam is generated. Flue gas then passes through a wet scrubber 13 where cooling and dust removal are achieved. The resulting sludge 14 is available for recycle to the smelter via the ore feed stream 1.

Cool flue gas leaving the scrubber 13 is fed to a flue gas desulphurisation unit 15.

Clean flue gas is then vented via a stack 16. This gas consists mainly of $CO_2$ and, if appropriate, it can be compressed and geo-sequestered (with appropriate removal of residual non-condensable gas species).

With particular reference to FIG. 2, the smelting vessel 4 includes a refractory-lined hearth 33 and side walls 41 defined predominantly by water-cooled panels that define the main chamber 19. The smelting vessel 4 also includes a forehearth 21 which is connected to the main chamber 19 via a forehearth connection 23.

During the course of a smelting campaign of the HIsarna process, molten metal produced in the main chamber 19 discharges from the main chamber 19 via the forehearth connection 23 and the forehearth 21.

In addition, the forehearth 21 and the forehearth connection 23 provide a passageway for the supply of a charge of molten metal to the main chamber 19 during hot start-up of the HIsarna process.

The process and the apparatus shown in FIG. 2 illustrate normal operation of the HIsarna smelting process in the smelting vessel 4, subject to the qualification that in normal operation the molten bath 25 is highly agitated, as described above. Under steady-state normal operating conditions, the forehearth 21 and the forehearth connection 23 contain molten metal. The normal manometer overflow system functions via "excess" metal (from production) spilling over forehearth lip 5 to keep the molten metal level in the main chamber 19 substantially constant.

With reference to FIG. 2, normal end-tapping of the smelting vessel 4, for example at the end of a smelting campaign, involves first draining molten slag 25b out of the main chamber 19 via a slag-drain taphole 41 (the tap-hole 41 is oriented out of the page toward the reader in FIG. 2). Molten metal 25a is then drained from the main chamber 19, the forehearth connection 23, and the forehearth 21 via the end-drain taphole 36 in the main chamber 19 (also oriented out of the page), leaving the main chamber 19 substantially clear of both metal and slag and, in particular, leaving the forehearth 23 empty and the forehearth connection 23 clear. The forehearth end-drain taphole 39 is not normally used under these conditions.

FIG. 3 illustrates the condition of the smelting vessel 4 when an end-tap has not been successful with respect to slag removal. In this situation, partly or completely frozen slag 27 occupies a lower part of the main chamber 19 and fills the forehearth connection 23 and a lower part of the forehearth 21.

In order to re-start the HIsarna process when the smelting vessel 4 contains frozen slag 27 as shown in FIG. 3, it is necessary to remove the frozen slag from the main chamber 19, the forehearth connection 23, and the forehearth 21. This is achieved in accordance with the present invention by using heat sources to melt frozen slag and drain it from the smelting vessel 4 via the forehearth 21 and establish a clear flow path through the forehearth connection 23 and the forehearth 21 to make it possible to supply a charge of molten metal to the main chamber via the forehearth 21 and the forehearth connection 23 as one of a series of steps to hot start the process.

One embodiment of the method of re-starting the HIsarna process in this situation, which is illustrated partly in FIGS. 4 and 5, includes the following steps:
- (a) heating and melting frozen slag 27 in the main chamber 19;
- (b) at the same time or after the commencement of step (a) heating and melting frozen slag 27 in the forehearth 21;
- (c) draining molten slag from the forehearth via the forehearth end-drain taphole 39 (also oriented out of the page),
- (d) heating and melting frozen slag 27 in the forehearth connection 23;
- (e) draining molten slag from the forehearth connection 23 and the main chamber 19 via the forehearth end-drain taphole 39 and establishing a clear flow path through the forehearth connection 23; and
- (f) hot starting the HIsarna process by a series of steps including supplying a charge of molten metal into the main chamber 19 via the forehearth 21 and the forehearth connection 23 and other steps to supply feed materials and re-commence smelting the metalliferous material and producing molten metal.

FIG. 4 shows the smelting vessel 4 during the course of step (a) set out above of heating and melting frozen slag in the main chamber 19 via a heat source 33 to progressively produce a pool of molten slag 29.

FIG. 4 also shows the smelting vessel 4 during the course of step (b) set out above of heating and melting frozen slag in the forehearth 23 via a heat source 43 to progressively produce a pool 45 of molten slag in the forehearth 21.

In step (c) set out above, molten slag 45 may be drained from the forehearth 21 by tapping via the forehearth end-drain taphole 39. FIG. 5 shows the forehearth 21 after the molten slag is tapped form the forehearth 21. In this state, with the forehearth empty, access to the frozen slag in the forehearth connection 23 is possible.

FIG. 5 illustrates step (d) set out above of applying a heat source 37 to the frozen slag in the forehearth connection 23 in order to melt the frozen slag and establish a clear forehearth connection 23. The heat source 37 may be an air-oxygen-fuel burner and/or oxygen lances. If necessary, line-of-sight access can be made available through the right-hand wall of the forehearth 21 (not shown).

Upon establishing a clear forehearth connection 23 between the forehearth 21 and the molten slag 29 in the main chamber 19, step (e) set out above may be executed. This step involves bulk removal of molten slag from the main chamber 19. This leads to establishment of suitable conditions for step (f) set out above, namely re-starting the HIsarna process by a series of steps including supplying a charge of hot metal into the main chamber 19 via the forehearth 21 and the forehearth connection 23 and thereafter supplying feed materials, such as slag forming agents, coal and oxygen into the main chamber and generating molten slag and agitation of the molten bath and off-gases and heat via post-combustion of off-gases and thereafter and supplying feed materials, such as metalliferous material and oxygen, into the smelt cyclone and partially melting and reducing the metalliferous material.

Many modifications may be made to the embodiment of the process of the present invention described above without departing from the spirit and scope of the invention.

The above-described embodiment focuses on the HIsarna process. The present invention is not limited to the HIsarna process and extends to any molten bath-based process in a direct smelting vessel that includes a forehearth for removing molten metal. By way of example, the present invention extends to the HIsmelt process. As is indicated above, the HIsmelt process is described in a considerable number of patents and patent applications in the name of the applicant. By way of example, the HIsmelt process is described in International application PCT/AU96/00197 in the name of the applicant. The disclosure in the patent specification lodged with the International application is incorporated herein by cross-reference.

The invention claimed is:

1. A method of starting a smelting process in a smelting vessel that includes a main chamber for smelting a metalliferous material and producing molten metal and a forehearth connected to the main smelting chamber via a forehearth connection, and which smelting vessel contains frozen slag that blocks at least the forehearth connection, the method of starting the process including heating frozen slag and forming molten slag and draining molten slag from the forehearth connection via the forehearth and establishing a clear flow path through the forehearth connection and thereafter hot starting the smelting process by a series of steps including supplying a charge of molten metal into the main chamber via the forehearth connection and supplying feed materials to the process and smelting the metalliferous material and producing molten metal.

2. The method defined in claim 1 includes removing molten slag via a forehearth end-drain taphole in a lowest region of the forehearth.

3. The method defined in claim 1 includes heating and melting frozen slag in the forehearth connection via oxygen-enriched gas burners and/or oxygen lances.

4. The method defined in claim 1 wherein, in a situation in which there is frozen slag in the main chamber, as well as frozen slag in the forehearth connection, the method includes heating and melting frozen slag in the main chamber and the forehearth connection.

5. The method defined in claim 4 includes heating and melting frozen slag in the main chamber via heat from a burner system for the main chamber.

6. The method defined in claim 1 wherein, in a situation in which there is frozen slag in the forehearth, as well as frozen slag in the forehearth connection, the method includes heating and melting frozen slag in the forehearth and the forehearth connection.

7. The method defined in claim 1 wherein, in a situation in which there is frozen slag in the main chamber, the forehearth connection, and the forehearth, the method includes the steps of heating and melting frozen slag in the main chamber, the forehearth and the forehearth connection.

8. The method defined in claim 7 includes:
- (a) heating and melting frozen slag in the main chamber;
- (b) heating and melting frozen slag in the forehearth;
- (c) draining molten slag from the forehearth,
- (d) heating and melting frozen slag in the forehearth connection;
- (e) draining molten slag from the forehearth connection and the main chamber via the forehearth and establishing a clear flow path through the forehearth connection; and
- (f) hot starting the smelting process by a series of steps including supplying a charge of molten material into the main chamber via the forehearth connection and supplying feed materials to the process and smelting the metalliferous material and producing molten metal.

9. The method defined in claim 1 wherein the metalliferous feed material includes an iron-containing material.

* * * * *